(12) United States Patent
Ishibashi

(10) Patent No.: US 12,552,614 B2
(45) Date of Patent: Feb. 17, 2026

(54) DEVICE AND METHOD FOR DETECTING WEAR IN CONVEYOR BELT

(71) Applicant: THE YOKOHAMA RUBBER CO., LTD., Hiratsuka (JP)

(72) Inventor: Yusuke Ishibashi, Hiratsuka (JP)

(73) Assignee: The Yokohama Rubber Co., Ltd., Kanagawa (JP)

( * ) Notice: Subject to any disclaimer, the term of this patent is extended or adjusted under 35 U.S.C. 154(b) by 56 days.

(21) Appl. No.: 18/709,923

(22) PCT Filed: Aug. 22, 2022

(86) PCT No.: PCT/JP2022/031553
§ 371 (c)(1),
(2) Date: May 14, 2024

(87) PCT Pub. No.: WO2023/132096
PCT Pub. Date: Jul. 13, 2023

(65) Prior Publication Data
US 2025/0011099 A1    Jan. 9, 2025

(30) Foreign Application Priority Data
Jan. 7, 2022   (JP) .................................. 2022-001713

(51) Int. Cl.
*B65G 43/02*    (2006.01)
*B65G 15/30*    (2006.01)

(52) U.S. Cl.
CPC ............. *B65G 43/02* (2013.01); *B65G 15/30* (2013.01); *B65G 2203/0275* (2013.01); *B65G 2203/046* (2013.01); *B65G 2207/48* (2013.01)

(58) Field of Classification Search
None
See application file for complete search history.

(56) References Cited

U.S. PATENT DOCUMENTS

| | | | | |
|---|---|---|---|---|
| 7,432,812 | B2 * | 10/2008 | Ray | H04Q 9/00 340/572.1 |
| 9,221,610 | B2 * | 12/2015 | Enshu | B65G 43/02 |
| 10,745,207 | B2 | 8/2020 | Hou | |

(Continued)

FOREIGN PATENT DOCUMENTS

| | | |
|---|---|---|
| JP | 2011-162276 A | 8/2011 |
| JP | 2018-115054 A | 7/2018 |

(Continued)

*Primary Examiner* — Kavel Singh
(74) *Attorney, Agent, or Firm* — Carrier, Shende & Associates P.C.; Joseph P. Carrier; Fulchand P. Shende

(57) ABSTRACT

Embedded bodies in a conveyor belt at intervals in a longitudinal direction each include a passive IC tag 3 at one side portion of the conveyor belt and a linear shaped detection element connected to the IC tag extending toward the other side portion to form a loop circuit. An embedding depth of the loop circuit into the conveyor belt is preset in advance, a transmission radio wave is emitted from a detector toward the IC tag, energization of the loop circuit 9 is determined using information transmitted from the IC tag to the detector via a return radio wave W2 emitted from the IC tag 3 in response to the transmission radio wave, and to determine a degree of wear on the surface of the conveyor belt in a range where the loop circuit 9 is embedded.

11 Claims, 8 Drawing Sheets

(56) References Cited

U.S. PATENT DOCUMENTS

2004/0149049 A1* 8/2004 Kuzik .................... B65G 43/02
  73/862.453
2004/0262132 A1   12/2004  Pauley et al.
2007/0252719 A1   11/2007  Ray

FOREIGN PATENT DOCUMENTS

JP    2021-020807 A    2/2021
WO    2018/096801 A1   5/2018

* cited by examiner

DEVICE AND METHOD FOR DETECTING WEAR IN CONVEYOR BELT

TECHNICAL FIELD

The present invention relates to a device and method for detecting wear in a conveyor belt and particularly relates to a device and method for detecting wear that allow efficient grasp of the degree of wear on the surface of a conveyor belt with high versatility and at low cost.

BACKGROUND ART

A conveyor belt that runs around a conveyor device transports various conveyed objects to a conveying destination. Since various conveyed objects are fed onto the conveyor belt, the surface of the conveyor belt is worn over time due to the conveyed objects or the like. When this wear reaches, for example, a core layer, the risk of damage to the core layer increases, and thus the conveyor belt needs to be replaced when the conveyor belt is worn to the wear limit depth.

In the related art, in order to detect wear on the surface of a conveyor belt, for example, the conveyor belt is stopped, and then the degree of wear in a predetermined location is grasped by using an ultrasonic thickness measurement instrument. This method has many manual operations and is performed with the conveyor belt stopped, making it difficult to efficiently grasp the degree of wear.

Another proposed method is a method of embedding an IC tag with a temperature sensor in a conveyor belt and grasping the state of wear on the surface in accordance with a temperature detected by the temperature sensor (an internal temperature of the conveyor belt) (see Patent Document 1). However, the IC tag with the temperature sensor needs to be specially manufactured, and an appropriate amount of cost is required. In addition, since the internal temperature of the conveyor belt is used, it may be necessary to consider correction of an error caused by an external environment. Thus, there is room for improvement in efficiently grasping the degree of wear on the surface of a conveyor belt with high versatility and at low cost.

CITATION LIST

Patent Literature

Patent Document 1: JP 2021-20807 A

SUMMARY OF INVENTION

Technical Problem

An object of the present invention is to provide a device and method for detecting wear that allow efficient grasp of the degree of wear on the surface of a conveyor belt with high versatility and at low cost.

Solution to Problem

To achieve the object described above, a device for detecting wear in a conveyor belt according to an embodiment of the present invention includes: an embedded body embedded in the conveyor belt; a detector configured to wirelessly communicate with the embedded body without contacting the conveyor belt; and a calculation unit connected to the detector. In the device, the embedded body includes an IC tag that is passive and a detection element connected to the IC tag, extending outside the IC tag to form a loop circuit, and having a linear shape. An embedding depth of the loop circuit from a surface of the conveyor belt is set in advance. A transmission radio wave is emitted from the detector toward the IC tag, presence or absence of energization of the loop circuit is determined by the calculation unit by using information transmitted from the IC tag to the detector via a return radio wave emitted from the IC tag in response to the transmission radio wave, and in accordance with this determination result, a degree of wear on the surface of the conveyor belt in a range where the loop circuit is embedded is grasped.

A method for detecting wear in a conveyor belt according to an embodiment of the present invention uses an embedded body embedded in the conveyor belt, a detector configured to wirelessly communicate with the embedded body without contacting the conveyor belt, and a calculation unit connected to the detector. The embedded body includes an IC tag that is passive and a detection element connected to the IC tag, extending outside the IC tag to form a loop circuit, and having a linear shape. The method includes: setting an embedding depth of the loop circuit from a surface of the conveyor belt in advance; emitting a transmission radio wave from the detector toward the IC tag; determining, by the calculation unit, presence or absence of energization of the loop circuit by using information transmitted from the IC tag to the detector via a return radio wave emitted from the IC tag in response to the transmission radio wave; and grasping, in accordance with this determination result, a degree of wear on the surface of the conveyor belt in a range where the loop circuit is embedded.

Advantageous Effects of Invention

According to an embodiment of the present invention, the embedded body has a simple configuration including the IC tag that is passive and the detection element connected to the IC tag extending outside the IC tag to form the loop circuit, and having a linear shape. Thus, the embedded body can be made up of general-purpose parts, which is advantageous to reduce costs. It is only required that the detector have specifications allowing for wireless communication with the embedded body, and the detector can be made up of general-purpose parts, which is advantageous to reduce costs.

Furthermore, when the surface of the conveyor belt is worn to the embedding depth of the loop circuit, the loop circuit is exposed to the surface to be damaged. Accordingly, in the IC tag to which the detection element forming the loop circuit is connected, whether the loop circuit is energized can be grasped. Thus, using the information from the IC tag transmitted via the return radio wave to the detector allows presence or absence of energization of the loop circuit to be accurately determined by the calculation unit. Since the embedding depth of the loop circuit from the surface of the conveyor belt is set in advance, it is determined based on this determination result whether the wear has progressed to the embedding depth of the loop circuit. As a result, the degree of wear on the surface of the conveyor belt can be efficiently grasped while the conveyor belt is allowed to run without a complicated operation.

DESCRIPTION OF EMBODIMENTS

Figure 1:
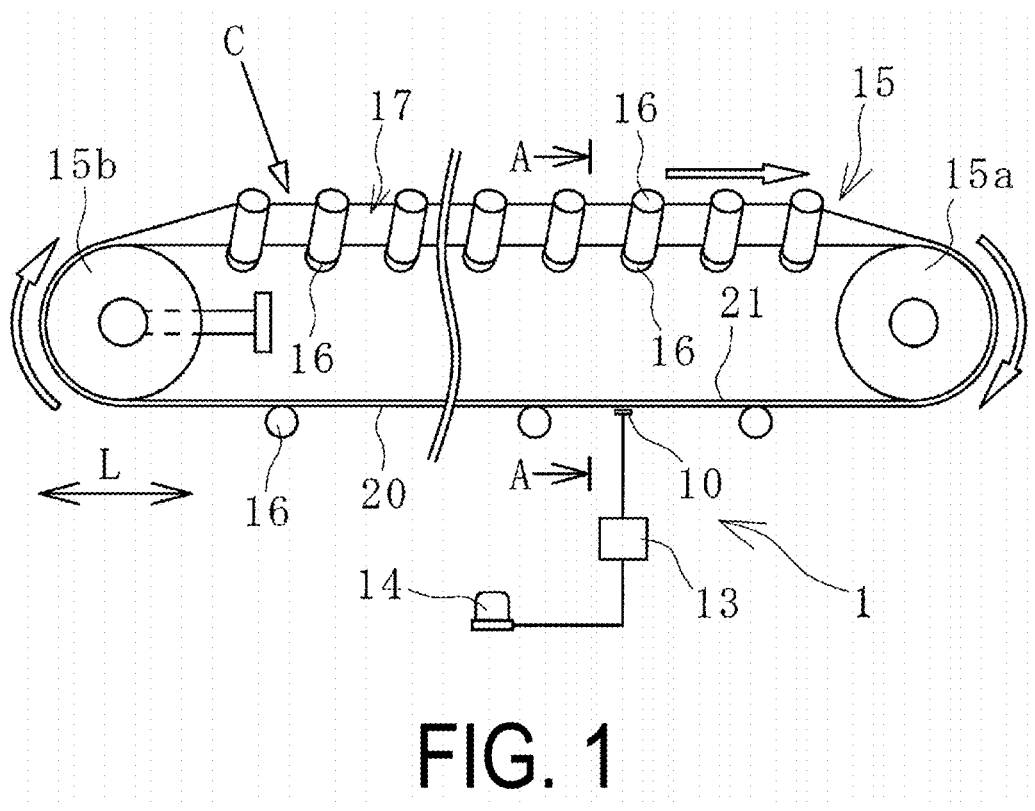
FIG. 1 is an explanatory diagram illustrating a device for detecting wear in a conveyor belt according to an embodiment of the present invention, which is disposed on a conveyor device, in a side view of the conveyor belt.
Figure 2:
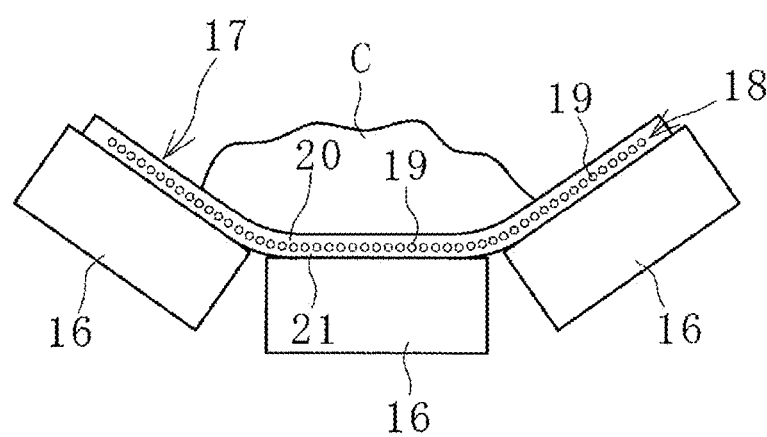
FIG. 2 is a cross-sectional view taken along a line A-A of FIG. 1.
Figure 2:
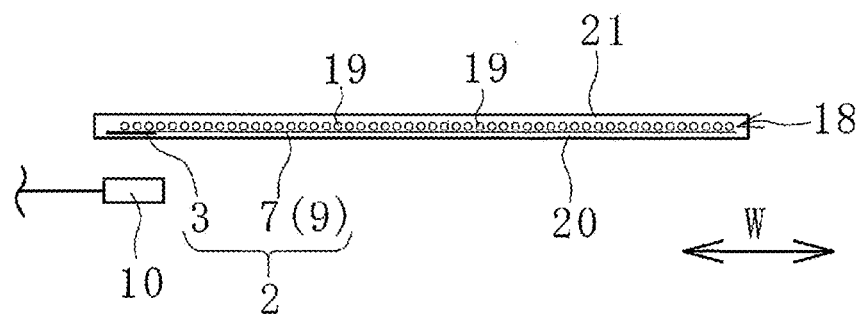
Figure 3:
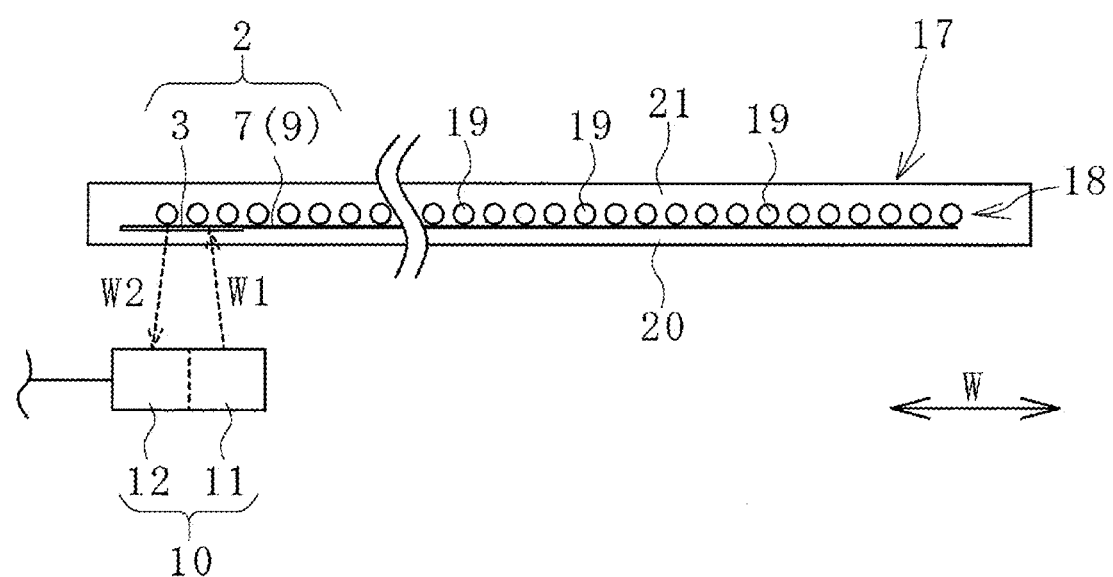
FIG. 3 is an explanatory diagram illustrating the conveyor belt of FIG. 1 in an enlarged cross-sectional view.

A device and method for detecting wear in a conveyor belt of the present invention will be described below based on embodiments illustrated in the drawings.

Figure 4:
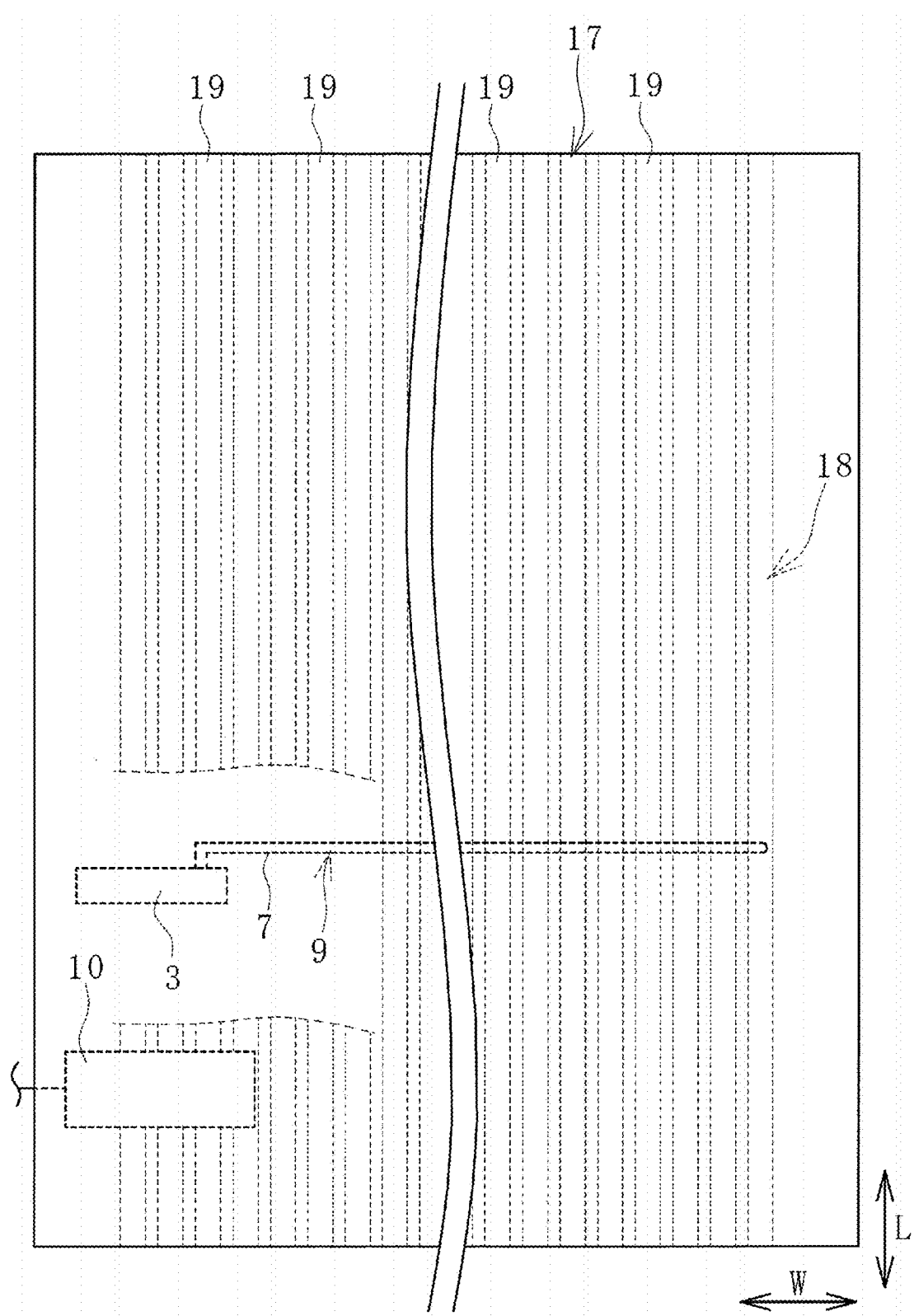
FIG. 4 is an explanatory diagram illustrating the conveyor belt of FIG. 3 in a plan view.

A detection device 1 for wear in a conveyor belt, illustrated in FIGS. 1 to 4 (hereinafter, referred to as a detection device 1), is placed on a conveyor device 15 and is configured to detect the degree of wear (wear depth) on the surface of a conveyor belt 17. In the drawings, an arrow L indicates a longitudinal direction of the conveyor belt 17, and an arrow W indicates a width direction of the conveyor belt 17. In FIG. 4, steel cords 19 are omitted in a partial range. In this embodiment, a detection element 7 (a loop circuit 9) is embedded in an upper cover rubber 20 in order to grasp the degree of wear on the surface of the upper cover rubber 20. However, in grasping the degree of wear on the surface of a lower cover rubber 21, the detection element 7 (the loop circuit 9) is embedded in the lower cover rubber 21.

The conveyor device 15 includes a pair of pulleys 15a and 15b and the conveyor belt 17 mounted between the pair of pulleys 15a and 15b. The conveyor belt 17 is supported by a number of support rollers 16 between the pulleys 15a and 15b.

The conveyor belt 17 is formed integrally of an upper cover rubber 20, a lower cover rubber 21, and a core layer 18 disposed between the upper cover rubber 20 and the lower cover rubber 21. The core layer 18 is formed such that a large number of the steel cords 19 extending in the longitudinal direction L are disposed side by side in the width direction W, and the steel cords 19 are joined to each other via coating rubber (adhesive rubber). The core layer 18 is not limited to the steel cords 19 and may be a fiber layer formed of canvas or the like. The conveyor belt 17 includes other members as necessary.

On the carrier side of the conveyor device 15 (on the upper side in FIGS. 1 and 2), the lower cover rubber 21 of the conveyor belt 17 is supported by the support rollers 16, and thus a central portion in the width direction W of the conveyor belt 17 is formed into a trough shape protruding downward. A conveyed object C is fed onto an upper surface of the upper cover rubber 20 to be transported. On the return side of the conveyor device 15 (on the lower side in FIGS. 1 and 2), the upper cover rubber 20 of the conveyor belt 17 is supported in a flat state by the support rollers 16.

The detection device 1 includes embedded bodies 2 embedded in the conveyor belt 17, a detector 10, and a calculation unit 13. In this embodiment, a warning device 14 is further provided. The warning device 14 may be optionally provided. The embedded bodies 2 each have a passive IC tag 3 and a linear detection element 7 connected to the IC tag 3. The detector 10 includes a transmission unit 11 and a reception unit 12.

Figure 5:
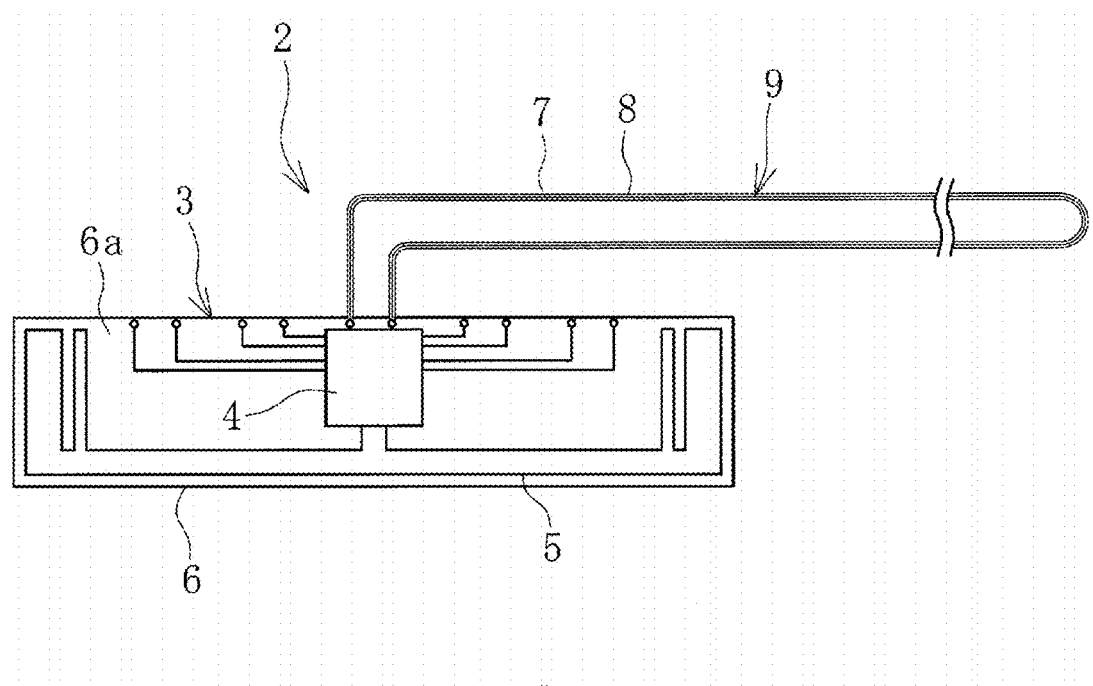
FIG. 5 is an explanatory diagram illustrating an embedded body of FIG. 4 in a plan view.
Figure 6:
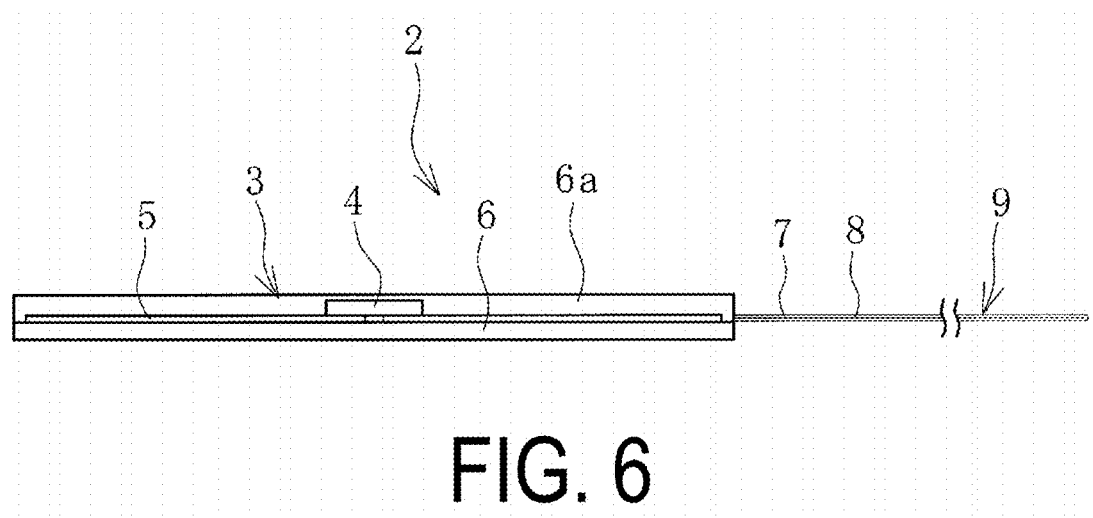
FIG. 6 is an explanatory diagram illustrating the embedded body of FIG. 4 in a front view.

As illustrated in FIGS. 5 and 6, the IC tag 3 includes an IC chip 4 and an antenna unit 5 connected to the IC chip 4. The IC chip 4 and the antenna unit 5 are disposed on a substrate 6. The IC chip 4 and the antenna unit 5 are covered with an insulating layer 6a, and the entire IC tag 3 is electrically insulated from the outside. However, the IC tag 3 and the detection element 7 are electrically conductively connected to each other. The insulating layer 6a is formed of a known insulating material such as insulating rubber, resins such as polyester, and natural fibers.

The IC chip 4 arbitrarily stores tag unique information such as an identification number of the IC tag 3, element identification information for specifying the detection element 7 connected to the IC tag 3, and other necessary information. Although various types of known antennas can be used as the antenna unit 5, a dipole antenna extending left-right symmetrically from the IC chip 4 is employed in this embodiment. The antenna unit 5 is appropriately folded back so as to increase the extension length in a limited space.

The commonly distributed specifications are adopted for the IC tag 3, and for example, an RFID tag can be used. The IC tag 3 has, for example, an area of 2 $cm^2$ or more and 70 $cm^2$ or less, more preferably 3 $cm^2$ or more and 34 $cm^2$ or less, and further more preferably 3 $cm^2$ or more and 27 $cm^2$ or less, and preferably has a thickness of 0.5 mm or less, for example, 0.01 mm or more and 0.4 mm or less, and more preferably 0.03 mm or more and 0.15 mm or less. As just described, the size of the IC tag 3 is made as small as possible and the heat resisting temperature is specified to be about 200° C.

The detection element 7 extends in the desired range of the conveyor belt 17 outside the IC tag 3 to which the detection element 7 is connected, and thus forms the loop circuit 9. The embedding depth (initial embedding depth) of the loop circuit 9 from the surface of the conveyor belt 17 is set in advance. In this embodiment, since the loop circuit 9 is embedded in the upper cover rubber 20, the embedding depth (initial embedding depth) from the surface of the upper cover rubber 20 is set in advance. Since there is a depth (wear limit depth) by which wear of the upper cover rubber 20 can be allowed, the embedding depth of the loop circuit 9 is set, for example, to this wear limit depth. When the loop circuit 9 is embedded in the lower cover rubber 21, the embedding depth (initial embedding depth) from the surface of the lower cover rubber 21 is set in advance.

The detection element 7 is a linear member having conductivity and is formed of a known material such as conductive rubber, conductive paste, or a metal wire. The detection element 7 has an outer diameter (a width) of, for example, approximately, 0.5 mm to 2.0 mm. The detection element 7 may be a simple wire having a circular cross-section but may be a flat linear member (band-like wire).

The outer peripheral surface of the detection element 7 is covered by an insulator 8, and the detection element 7 is electrically insulated from the outside. The insulator 8 is formed of a known insulating material in the same way as the insulating layer 6a.

One end portion and the other end portion of the detection element 7 in the longitudinal direction are electrically connected to the IC chip 4. The IC tag 3 (the substrate 6) is provided with a large number of pairs of terminals connected to the IC chip 4. Each of one end portion and the other end portion of the detection element 7 in the longitudinal direction is connected to the pair of terminals and thus is electrically connected to the IC chip 4. The detection element 7 and the pair of terminals are connected by using an eyelet and a crimp terminal or by using a conductive adhesive, welding, solder, or the like. In this embodiment, five pairs of terminals are provided; however, the number of pairs of terminals provided on the IC tag 3 (the substrate 6) is not particularly limited and may be one pair of terminals. Since a space is restricted, the number of pairs of terminals provided on one IC tag 3 (substrate 6) is, for example, about one to six pairs of terminals.

The detection element 7 (the loop circuit 9) preferably extends in a position corresponding to a range in which the degree of wear is desired to be grasped in a plan view, and the IC tag 3 is preferably embedded in an end portion of the conveyor belt 17 in the width direction. In this embodiment, the IC tag 3 is embedded in one end portion of the conveyor belt 17 in the width direction, and the detection element 7 (the loop circuit 9) extends to the other end portion of the core layer 18 in the width direction.

The degree of wear on the surface of the conveyor belt 17 is substantially similar over the entire length of the conveyor belt 17 in the longitudinal direction L. Consequently, only one embedded body 2 may be embedded in the conveyor belt 17. In consideration of a failure or the like of the embedded body 2, the embedded bodies 2 may be embedded in a plurality of positions separated from each other in the longitudinal direction L of the conveyor belt 17. When the embedded bodies 2 are embedded in a plurality of positions, the embedded bodies 2 forming the loop circuits 9 having different embedding depth may be disposed in a mixed manner.

On the other hand, since the degree of wear on the surface of the conveyor belt 17 greatly differs in the width direction W, the detection element 7 (the loop circuit 9) preferably extends so as to cover the entire width of the core layer 18. Alternatively, in the upper cover rubber 20, the central portion in the width direction W is most likely to wear, and thus the detection element 7 (the loop circuit 9) may extend so as to cover at least the central portion in the width direction W.

The IC tag 3 may be embedded in a central portion in the width direction W of the conveyor belt 17, and the detection element 7 (the loop circuit 9) may extend toward both end portions in the width direction. However, the IC tag 3 is embedded in the end portion of the conveyor belt 17 in the width direction, which is advantageous to protect the IC tag 3 from an impact or the like due to the conveyed object C. In this embodiment, the IC tag 3 is embedded in the upper cover rubber 20, but may be embedded in the lower cover rubber 21 in order to protect the IC tag 3 from an impact or the like due to the conveyed object C. When the IC tag 3 is embedded in the lower cover rubber 21, the detector 10 is disposed to face the lower cover rubber 21.

The commonly distributed specifications that allow wireless communication with a passive RFID tag or the like are adopted for the detector 10. Thus, the IC tag 3 and the detector 10 constitute a radio frequency identification (RFID) system.

The detector 10 is disposed at a position near the conveyor belt 17 to wirelessly communicate with each of the embedded bodies 2 (the IC tags 3) without contacting the conveyor belt 17. The transmission unit 11 constituting the detector 10 emits a transmission radio wave W1 toward the IC tag 3. The reception unit 12 constituting the detector 10 receives a return radio wave W2 emitted from the IC tag 3 in response to the transmission radio wave W1. The information stored in the IC chip 4 is transmitted via the return radio wave W2 and received by the reception unit 12 to be acquired by the detector 10.

The frequency of radio waves used in wireless communication in the present invention is mainly an UHF band (different from country to country, but in the range of 860 MHz or higher and 930 MHz or lower; 915 MHz or higher and 930 MHz in Japan), and an HF band (13.56 MHz) can also be used. The radio wave used may be a linearly polarized wave or a circularly polarized wave.

In this embodiment, the detector 10 is disposed on the return side of the conveyor device 15 but may be disposed on the carrier side. The distance between the detector 10 and the IC tag 3 (the antenna unit 5) when they are closest to each other is set within 1 m, for example. In other words, the detector 10 is preferably placed at a position where the distance between the detector 10 and the IC tag 3 (the antenna unit 5) is 1 m or less when the IC tag 3 (the antenna unit 5) passes in front of the detector 10.

The calculation unit 13 is connected by wire or wirelessly to the detector 10. A known computer or the like is used as the calculation unit 13. A variety of information acquired by the detector 10 is input into the calculation unit 13. In the calculation unit 13, the embedding depth (initial embedding depth) of the detection element 7 (the loop circuit 9) from the surface of the upper cover rubber 20 is stored in association with element identification information for specifying the detection element 7. When the detection element 7 (the loop circuit 9) is embedded in the lower cover rubber 21, the embedding depth (initial embedding depth) from the surface of the lower cover rubber 21 is stored in the calculation unit 13 in association with the element identification information of the detection element 7. Embedded position data (at least position data in the longitudinal direction L) of each IC tag 3 in the conveyor belt 17 is stored in the calculation unit 13 in association with tag unique information for specifying each IC tag 3. Position information (position data in the longitudinal direction L or the width direction W) of each detection element 7 (the loop circuit 9 formed by each detection element 7) with respect to the IC tag 3 to which the detection element 7 is connected may be stored in the calculation unit 13 in association with the element identification information of each detection element 7.

Examples of the warning device 14 can include an alarm, a warning lamp, and an alarm indicator. The warning device 14 is connected by wire or wirelessly to the calculation unit 13, and the operation of the warning device 14 is controlled by the calculation unit 13. When determining that wear on the surface of the upper cover rubber 20 has progressed to the wear limit depth, the calculation unit 13 activates the warning device 14.

In manufacturing the conveyor belt 17, the embedded bodies 2 are disposed in the upper cover rubber 20 having not been vulcanized or the lower cover rubber 21 having not been vulcanized, in a molding step; thereafter, through a vulcanization step, the embedded bodies 2 embedded in the conveyor belt 17 are integrated with the upper cover rubber 20 or the lower cover rubber 21. In order to improve working efficiency in the molding step, for example, a unit in which the embedded body 2 is sandwiched between upper and lower unvulcanized rubber sheets may be formed in advance, and this unit may be disposed in the upper cover rubber 20 or the lower cover rubber 21 in the molding step.

The steel cord 19 greatly affects the state of radio wave communication between the detector 10 and the IC tag 3. Accordingly, when the core layer 18 is formed of a large number of the steel cords 19 disposed side by side in the width direction, the embedding direction of the IC tag 3 is set to a specific direction in which the intensity of the return radio wave W2 received by the detector 10 is higher than a predetermined threshold value.

Accordingly, the relationship between the embedding direction of the IC tag 3 and the intensity of the return radio wave W2 received by the detector 10 is grasped in advance by performing a preliminary test or the like. For example, test products are produced in which the IC tags 3 are embedded in different embedding directions in the conveyor belt 17 or a cut sample of the conveyor belt 17. The detector 10 is placed at a position right above the IC tag 3 of each of the test products, and the transmission radio wave W1 is emitted from the transmission unit 11 toward the IC tag 3. Then, the intensity of the return radio wave W2 emitted from the IC tag 3 in response to the transmission radio wave W1 and received by the reception unit 12 is measured to grasp the relation between the embedding direction of the IC tag 3 and the intensity of the return radio wave W2. Thereafter, the embedding direction in which the intensity of the return radio wave W2 received by the detector 10 is higher than a predetermined threshold value is specified. This threshold value may be set to a value at which stable wireless communication can be practically performed between the detector 10 and the IC tag 3.

In embedding the IC tag 3 in the conveyor belt 17, the IC tag 3 is embedded in the specified embedding direction. In this embodiment, since a dipole antenna is used as the antenna unit 5, as illustrated in FIGS. 4 and 5, the IC tag 3 is embedded in the conveyor belt 17 such that the left-right direction in which the antenna unit 5 extends in a plan view is orthogonal to the extension direction of the steel cord 19 (i.e., the longitudinal direction L). Adopting such an embedding direction makes the state of communication between the detector 10 and the IC tag 3 satisfactory, allowing for stable wireless communication (allowing for the longer communicable distance).

In a case where the core layer 18 is a fiber layer made of canvas or the like, the core layer 18 does not greatly affect the state of radio wave communication between the detector 10 and the IC tag 3. Consequently, it is not necessary to strictly specify the embedding direction of the IC tag 3, but it is preferable to specify the embedding direction as described above.

Since the embedded position and embedding direction of the IC tag 3 on the conveyor belt 17 are determined, a linearly polarized wave rather than a circularly polarized wave is more preferably used to improve the state of wireless communication between the detector 10 and the IC tag 3. In this case, the detector 10 is disposed such that the direction of the linearly polarized wave (the direction of the vertically polarized wave) coincides with (i.e., is parallel to) the left-right direction in which the antenna unit 5 extends and that the detector 10 and the IC tag 3 face each other when the traveling IC tag 3 passes in front of the detector 10. Also, in a case where the circularly polarized wave is used, the detector 10 may be disposed such that the detector 10 and the IC tag 3 face each other when the traveling IC tag 3 passes in front of the detector 10.

Next, an example of a procedure of a method for grasping the degree of wear by using the detection device 1 will be described.

As illustrated in FIGS. 1 to 4, while the conveyor device 15 is in operation (while the conveyor belt 17 is running), the detector 10 emits the transmission radio wave W1 from the transmission unit 11 toward the IC tag 3 (the antenna unit 5) passing in front of the detector 10. When receiving the transmission radio wave W1, the IC tag 3 emits the return radio wave W2 to the reception unit 12 in response to the transmission radio wave W1.

Specifically, when the embedded body 2 (the loop circuit 9) is healthy, electricity is input into the IC chip 4 via the transmission radio wave W1 received by the antenna unit 5 to activate the IC chip 4. When the IC chip 4 is activated, electricity flows from one end portion of the detection element 7 through the loop circuit 9 to the other end portion of the detection element 7 to be input into the IC chip 4. As a result, the IC chip 4 recognizes that the loop circuit 9 is energized. Then, the tag unique information of the IC tag 3 stored in the IC chip 4 and the element identification information of the detection element 7 forming the loop circuit 9 are called. Thereafter, when the return radio wave W2 is emitted from the antenna unit 5, the tag unique information of the IC tag 3 and the element identification information of the detection element 7 that have been called are transmitted via the return radio wave W2 to be received by the reception unit 12.

The reception unit 12 receives the return radio wave W2 to acquire the information (tag unique information and element identification information) transmitted from the IC chip 4 via the return radio wave W2. The information (tag unique information and element identification information) acquired by the detector 10 is input into the calculation unit 13. The calculation unit 13 uses the acquired tag unique information of each IC tag 3 to specify the embedded position information on the conveyor belt 17 of the IC tag 3 associated with the tag unique information stored in advance. The calculation unit 13 uses the acquired element identification information of each detection element 7 to specify the embedding depth of the detection element 7 (the loop circuit 9 formed by the detection element 7) associated with the element identification information stored in advance.

As just described, the calculation unit 13 determines that the detection element 7, the element identification information of which is input into the calculation unit 13 is sound and that the loop circuit 9 formed by the detection element 7 is energized. Further, since the embedding depth of the detection element 7 has been determined, the calculation unit 13 determines that wear has not progressed to the embedding depth of the loop circuit 9 in the embedded range of the loop circuit 9 formed by the detection element 7. Furthermore, since the embedded position information of the IC tag 3 to which the detection element 7 is connected in the conveyor belt 17 is specified, it can be grasped that the range in which it is determined that wear has not progressed to the embedding depth of the loop circuit 9 is located substantially near the embedded position of the IC tag 3.

When the upper cover rubber 20 is worn to the embedding depth of the loop circuit 9, the loop circuit 9 is exposed to the surface, and the loop circuit 9 breaks shortly. The loop circuit 9 is damaged. In such a case, even when electricity is input into the IC chip 4 via the transmission radio wave W1 received by the antenna unit 5 and the IC chip 4 is activated, the electricity does not flow through the loop circuit 9, and thus the IC chip 4 recognizes that the loop circuit 9 is not energized. Accordingly, even though the tag unique information of the IC tag 3 stored in the IC chip 4 is called, the element identification information of the detection element 7 forming the loop circuit 9 is not called. In addition, when the return radio wave W2 is emitted from the antenna unit 5, the called tag unique information of the IC tag 3 is transmitted via the return radio wave W2 to be received by the reception unit 12; however, the element identification information of the detection element 7 forming the loop circuit 9 is not received by the reception unit 12.

In other words, the information (tag unique information) acquired by the detector 10 is input into the calculation unit 13, and the calculation unit 13 uses the acquired tag unique information of each IC tag 3 to specify the embedded position information on the conveyor belt 17 of the IC tag 3 associated with the tag unique information stored in advance. However, since the element identification information of the detection element 7 connected to the IC tag 3 does not exist, it is determined that the loop circuit 9 formed by the detection element 7 is damaged. In other words, in this case, in the range in which the loop circuit 9 is embedded, the calculation unit 13 determines that wear has progressed to the embedding depth of the loop circuit 9.

Additionally, in a case where the IC tag 3 is damaged due to the generation of a longitudinal tear or the like, the reception unit 12 receives neither the tag unique information of the IC tag 3 nor the element identification information of the detection element 7 connected to the IC tag 3 even though the transmission radio wave W1 is emitted from the transmission unit 11 to the IC tag 3. As a result, it can be determined that a defect has occurred in the conveyor belt 17.

When it is determined that wear has progressed to the embedding depth of the loop circuit 9, the warning device 14 is activated to notify the surroundings that wear of the upper cover rubber 20 has progressed to the limit depth. Since the embedded position information on the conveyor belt 17 of the IC tag 3 from which the element identification information of the connected detection element 7 cannot be acquired is specified, it can be confirmed that the upper cover rubber 20 is actually worn to the wear limit depth at a location near the embedded position of the IC tag 3.

The supervisor who recognizes that the upper cover rubber 20 has been worn to the wear limit depth stops traveling of the conveyor belt 17 at an appropriate timing and takes action such as replacement of the conveyor belt 17. Operation of the conveyor device 15 is resumed after the completion of this action.

The detection device 1 has a simple configuration in which the embedded body 2 includes the passive IC tag 3 and the linear detection element 7 connected to the IC tag 3 and extending in the width direction W of the conveyor belt 17 to form the loop circuit 9. Thus, the embedded body 2 can be made up of general-purpose parts, which is advantageous to reduce costs. Further, the detector 10 may have specifications that allow wireless communication with the embedded body 2 and thus can be made up of general-purpose parts, which is advantageous to reduce costs.

As described above, using the information from the IC tag 3 transmitted via the return radio wave W2 to the detector 10 allows presence or absence of energization of the loop circuit 9 to be accurately determined by the calculation unit 13. Since the embedding depth of the loop circuit 9 from the surface of the upper cover rubber 20 is set in advance, whether wear has progressed to the embedding depth of the loop circuit 9 is determined based on the determination result of whether the loop circuit 9 is energized. As a result, the degree of wear on the surface of the conveyor belt 17 (the upper cover rubber 20) can be efficiently grasped while the conveyor belt 17 is allowed to run without a complicated operation.

With the cost reduction of the embedded body 2, a plurality (a number) of the embedded bodies 2 can be embedded in the conveyor belt 17. Thus, it is advantageous to subdivide the range in which the degree of wear is grasped and thereby grasp the degree of wear of the upper cover rubber 20 in more detail. Embedding a plurality (a number) of the embedded bodies 2 allows the degree of wear to be grasped by the remaining embedded bodies 2 even when some of the embedded bodies 2 is broken.

The detection element 7 (the loop circuit 9) may extend not only in parallel with the width direction W but also in an inclined manner in the front-back direction (longitudinal direction L) with respect to the width direction W. The detection element 7 (the loop circuit 9) extends in an inclined manner as just described, which is advantageous to further reduce changes in bending rigidity (to smoothly change bending rigidity) when the conveyor belt 17 passes through the surroundings of the pulleys 15a and 15b, compared to a case where the detection element 7 extends in parallel with the width direction W (the inclination angle is zero). Using, as the detection element 7, conductive rubber or conductive paste, which has lower rigidity than a metal wire, allows the bending rigidity when the conveyor belt 17 passes through the surroundings of the pulleys 15a and 15b to be further reduced.

If the detection element 7 is made of a thin wire having a simple circular cross-section when a sharp conveyed object C is fed onto the conveyor belt 17, the detection element 7 may be cut by the sharp portion of the conveyed object C. Accordingly, the loop circuit 9 is broken even though wear has not progressed to the embedding depth of the loop circuit 9 formed by the detection element 7. Consequently, the calculation unit 13 determines that wear has progressed to the embedding depth, resulting in erroneous detection.

As a result, it is preferable to use a flat linear member (band-like wire) as the detection element 7. The use of the band-like detection element 7 in a plan view is advantageous to avoid the aforementioned erroneous detection. The width of the flat detection element 7 is, for example, about 5 mm or more and 10 mm or less.

Figure 7:
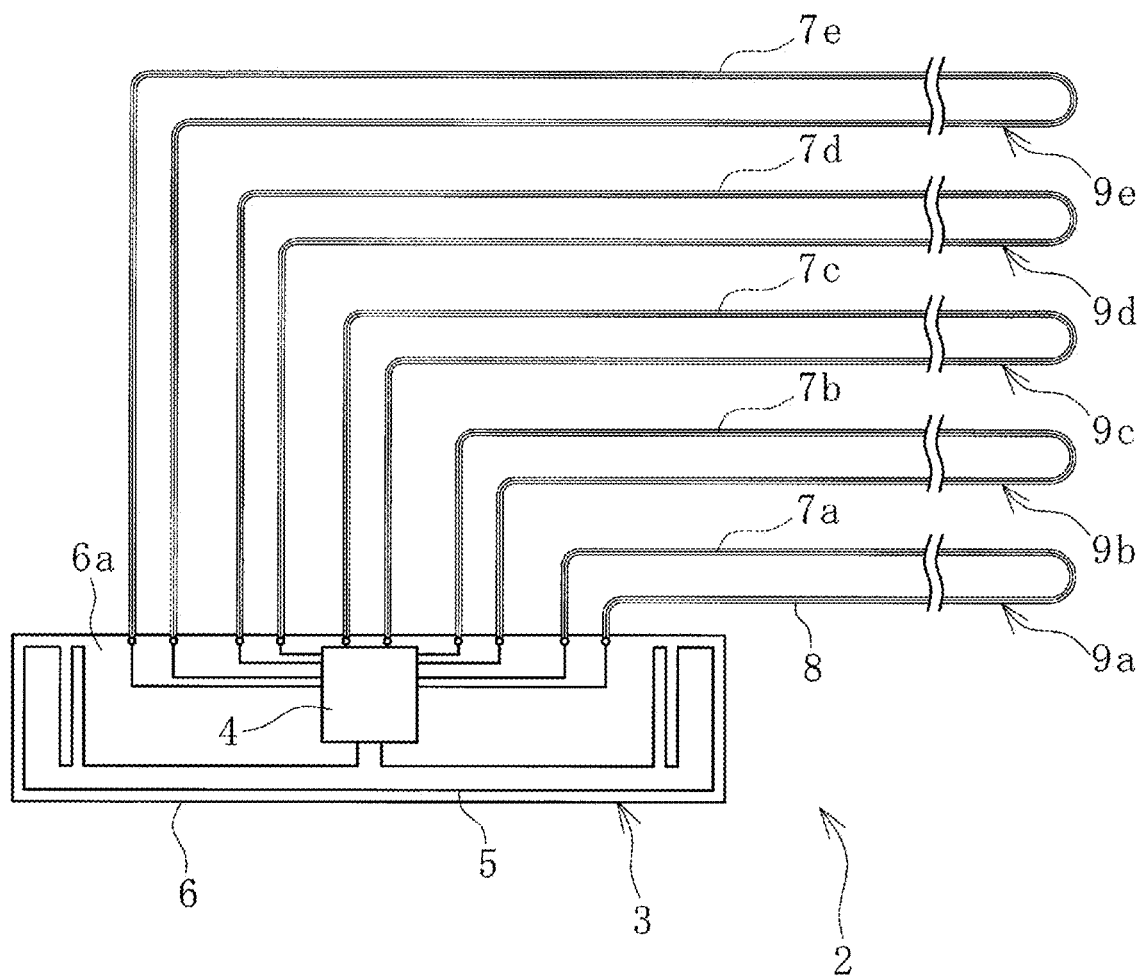
FIG. 7 is an explanatory diagram illustrating a modified example of the embedded body in a plan view.

The embedded body 2 illustrated in FIG. 7 may be used. The embedded body 2 is configured such that a plurality of (five) detection elements 7a to 7e is connected to one IC tag 3. The outer peripheral surface of each of the detection elements 7a to 7e is covered by the insulator 8. The detection elements 7a to 7e respectively form independent loop circuits 9a to 9e. Thus, a plurality of (five) independent loop circuits 9 is connected to one IC tag 3.

Figure 8:
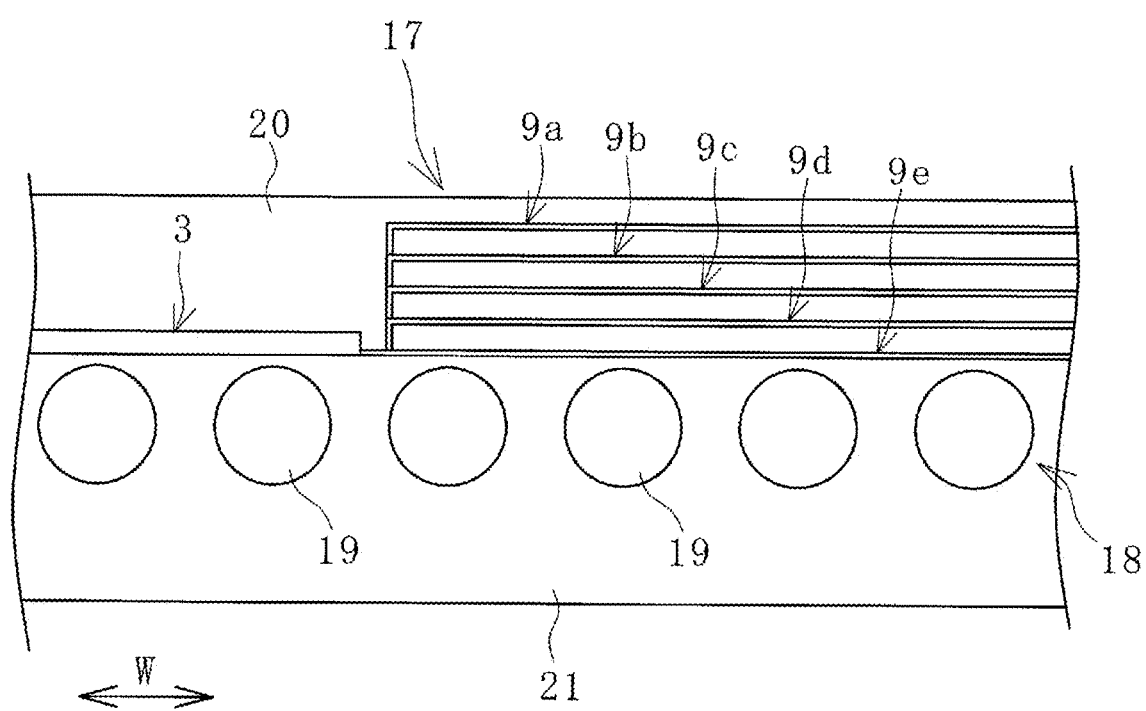
FIG. 8 is an explanatory diagram illustrating a portion of the conveyor belt in which the embedded body of FIG. 7 is embedded in an enlarged cross-sectional view.

As illustrated in FIG. 8, the embedded body 2 is embedded such that the independent loop circuits 9a to 9e are disposed at intervals in the thickness direction (depth direction) of the conveyor belt 17. The embedding intervals in the thickness direction (depth direction) between the independent loop circuits 9a to 9e are be set to be, for example, in the range of 0.5 mm or more and 2 mm or less, and the embedding intervals are preferably equal to each other. The embedding depth of the loop circuit 9e embedded at the deepest position is preferably set to the wear limit depth.

When the embedded bodies 2 are used, as wear of the upper cover rubber 20 progresses, the loop circuits 9a, 9b, 9c, 9d, 9e are sequentially damaged and are not energized. As a result, by using the embedded bodies 2, the progress state of wear of the upper cover rubber 20 can be grasped in more detail.

Also, by embedding a plurality of the embedded bodies 2 illustrated in FIG. 5 in the conveyor belt 17 (the upper cover rubber 20) and, for example, by setting different embedding depths of the loop circuits 9 of the respective embedded bodies 2, the progress state of wear of the upper cover rubber 20 can be grasped in more detail. Using the embedded bodies 2 illustrated in FIGS. 7 and 8 is advantageous to reduce the number of embedded bodies 2 embedded in the entire conveyor belt 17.

As illustrated in FIG. 8, when the loop circuits 9a to 9e are embedded at intervals in the depth direction, the positions (positions in the longitudinal direction L) of the loop circuits 9a to 9e in a plan view may be the same or may be shifted in the longitudinal direction L. When the positions (positions in the longitudinal direction L) of the loop circuits 9a to 9e in a plan view are the same, the operation for embedding the loop circuits 9a to 9e is facilitated. On the other hand, the positions (positions in the longitudinal direction L) of the loop circuits 9a to 9e in a plan view are shifted in the longitudinal direction L, which is advantageous to reduce changes in bending rigidity (to smoothly change bending rigidity) when the conveyor belt 17 passes through the surroundings of the pulleys 15a, 15b.

REFERENCE SIGNS LIST

1 Detection device
2 Embedded body
3 IC tag
4 IC chip
5 Antenna unit
6 Substrate
6a Insulating layer
7 (7a, 7b, 7c, 7d, 7e) Detection element
8 Insulator
9 (9a, 9b, 9c, 9d, 9e) Loop circuit
10 Detector
11 Transmission unit
12 Reception unit
13 Calculation unit
14 Warning device
15 Conveyor device
15a, 15b Pulley
16 Support roller
17 Conveyor belt
18 Core layer
19 Steel cord
20 Upper cover rubber
21 Lower cover rubber
C Conveyed object

The invention claimed is:

1. A device for detecting wear in a conveyor belt, the device comprising:
an embedded body embedded in the conveyor belt formed integrally of an upper cover rubber, a lower cover rubber, and a core layer disposed between the upper cover rubber and the lower cover rubber, an upper surface of the upper cover rubber being configured to have a conveyed object fed thereon;
a detector configured to wirelessly communicate with the embedded body without contacting the conveyor belt; and
a calculation unit connected to the detector;
the embedded body comprising an IC tag that is passive and a detection element connected to the IC tag, extending outside the IC tag to form a loop circuit, and having a linear shape,
an embedding depth of the loop circuit from a surface of the conveyor belt being set in advance, and the IC tag is embedded in one end portion of the conveyor belt in a width direction and the loop circuit extends to the other end portion of the core layer in the width direction, and
a transmission radio wave being emitted from the detector toward the IC tag, presence or absence of energization of the loop circuit being determined by the calculation unit by using information transmitted from the IC tag to the detector via a return radio wave emitted from the IC tag in response to the transmission radio wave, and in accordance with this determination result, a degree of wear on the surface of the conveyor belt in a range where the loop circuit is embedded being grasped.

2. The device for detecting wear in a conveyor belt according to claim 1, wherein the detection element is conductive rubber, conductive paste, or a metal wire.

3. The device for detecting wear in a conveyor belt according to claim 1, wherein
a plurality of the loop circuits that are independent is connected to the IC tag, and
the loop circuits that are independent are each embedded at intervals in a thickness direction of the conveyor belt.

4. The device for detecting wear in a conveyor belt according to claim 1, wherein
a core layer of the conveyor belt is made up of a large number of steel cords disposed side by side in a width direction, and
an embedding direction of the IC tag is set to a specific direction in which an intensity of the return radio wave received by the detector is higher than a predetermined threshold value.

5. The device for detecting wear in a conveyor belt according to claim 2, wherein
a plurality of the loop circuits that are independent is connected to the IC tag, and
the loop circuits that are independent are each embedded at intervals in a thickness direction of the conveyor belt.

6. The device for detecting wear in a conveyor belt according to claim 2, wherein
a core layer of the conveyor belt is made up of a large number of steel cords disposed side by side in a width direction, and
an embedding direction of the IC tag is set to a specific direction in which an intensity of the return radio wave received by the detector is higher than a predetermined threshold value.

7. The device for detecting wear in a conveyor belt according to claim 3, wherein
a core layer of the conveyor belt is made up of a large number of steel cords disposed side by side in a width direction, and
an embedding direction of the IC tag is set to a specific direction in which an intensity of the return radio wave received by the detector is higher than a predetermined threshold value.

8. The device for detecting wear in a conveyor belt according to claim 1, wherein the detection element is a flat band-like wire.

9. The device for detecting wear in a conveyor belt according to claim 1, wherein
in the calculation unit, the embedding depth of the loop circuit is stored in association with element identification information for specifying the detection element which forms the loop circuit,
in the calculation unit, at least position data in the longitudinal direction of the conveyor belt is stored in association with tag unique information for specifying the IC tag as a placement position information of the IC tag in the conveyor belt, and the tag unique information of the IC tag connected to the loop circuit being properly operational and the element identification information of the detection element forming the loop circuit are transmitted via the return radio wave to be received by the detector.

10. A method for detecting wear in a conveyor belt using an embedded body embedded in the conveyor belt formed integrally of an upper cover rubber, a lower cover rubber, and a core layer disposed between the upper cover rubber and the lower cover rubber, an upper surface of the upper cover rubber being configured to have a conveyed object fed thereon, a detector configured to wirelessly communicate with the embedded body without contacting the conveyor belt, and a calculation unit connected to the detector, the embedded body comprising an IC tag that is passive and a detection element connected to the IC tag, extending outside the IC tag to form a loop circuit, and having a linear shape, the method comprising:

setting an embedding depth of the loop circuit from a surface of the conveyor belt in advance;

embedding the IC tag in one end portion of the conveyor belt in a width direction and extending the loop circuit to the other to the other end portion of the core layer in the width direction, emitting a transmission radio wave from the detector toward the IC tag; and determining, by the calculation unit, presence or absence of energization of the loop circuit by using information transmitted from the IC tag to the detector via a return radio wave emitted from the IC tag in response to the transmission radio wave; and grasping, in accordance with this determination result, a degree of wear on the surface of the conveyor belt in a range where the loop circuit is embedded.

11. The method for detecting wear in a conveyor belt according to claim 10, a core layer of the conveyor belt being made up of a large number of steel cords side by side in a width direction, the method comprising:

grasping in advance a relationship between an embedding direction of the IC tag and an intensity of the return radio wave received by the detector;

specifying the embedding direction in which the intensity of the return radio wave received by the detector is higher than a predetermined threshold value; and embedding the IC tag in the conveyor belt in the embedding direction specified.

* * * * *